United States Patent
Speer

(10) Patent No.: US 8,540,212 B2
(45) Date of Patent: Sep. 24, 2013

(54) SOLENOID VALVE, ARMATURE FOR A SOLENOID VALVE, AND METHOD FOR PRODUCING AN ARMATURE FOR A SOLENOID VALVE

(75) Inventor: Harald Speer, Freiberg (DE)

(73) Assignee: Robert Bosch GmbH, Stuttgart, DE (US)

(*) Notice: Subject to any disclaimer, the term of this patent is extended or adjusted under 35 U.S.C. 154(b) by 172 days.

(21) Appl. No.: 12/975,870

(22) Filed: Dec. 22, 2010

(65) Prior Publication Data

US 2011/0147625 A1 Jun. 23, 2011

(30) Foreign Application Priority Data

Dec. 23, 2009 (DE) .................... 10 2009 055 232

(51) Int. Cl.
*F16K 31/02* (2006.01)

(52) U.S. Cl.
USPC ............... 251/129.15; 251/64; 251/129.07

(58) Field of Classification Search
USPC .................. 251/129.07, 129.15, 64
See application file for complete search history.

(56) References Cited

U.S. PATENT DOCUMENTS

| | | | | |
|---|---|---|---|---|
| 3,588,039 A | * | 6/1971 | Chelminski | 251/129.15 |
| 4,896,699 A | * | 1/1990 | Shimamura et al. | 137/630 |
| 4,989,829 A | * | 2/1991 | Bickel | 251/129.07 |
| 5,553,829 A | * | 9/1996 | Hemsen | 251/129.21 |

* cited by examiner

Primary Examiner — John K Fristoe, Jr.
Assistant Examiner — Kevin E Lynn
(74) Attorney, Agent, or Firm — Maginot, Moore & Beck

(57) ABSTRACT

The invention relates to a solenoid valve, in particular for a brake system of a motor vehicle, having an axially displaceably supported armature, on one end of which a valve sealing body is disposed and with the other end of which a pole core is associated, and having a compression spring acting in prestressed fashion between the pole core and the armature. It is provided that the compression spring is held in prestressed fashion in an axial passage of the armature, between a bolt, having the valve sealing body and held in a selectable position in the axial passage in force- and/or form-locking fashion, and a thrust piece, disposed such that it can be pushed out of the axial passage up to a stop and subjects the pole core to the prestressing force. The invention further relates to an armature for a solenoid valve. Finally, the invention relates to a method for producing an armature for a solenoid valve.

14 Claims, 2 Drawing Sheets

SOLENOID VALVE, ARMATURE FOR A SOLENOID VALVE, AND METHOD FOR PRODUCING AN ARMATURE FOR A SOLENOID VALVE

CROSS-REFERENCE TO RELATED APPLICATION

This application is based on German Patent Application 10 2009 055 232.4 filed on Dec. 23, 2009.

BACKGROUND OF THE INVENTION

1. Field of the Invention

The invention relates to a solenoid valve, in particular for a brake system of a motor vehicle, having an axially displaceably supported armature, on one end of which a valve sealing body is disposed and with the other end of which a pole core is associated, and having a compression spring acting in prestressed fashion between the pole core and the armature.

Furthermore, the invention relates to an armature for a solenoid valve, in particular as it is described above, which has an axial receptacle in which a compression spring rests in at least some regions.

Finally, the invention relates to a method for producing an armature for a solenoid valve.

2. Description of the Prior Art

Solenoid valves, armatures, and methods for producing them of the generic type are known from the prior art. In particular in motor vehicle brake systems, solenoid valves are used for controlling or regulating the pressure buildup in a hydraulic system. Often, valves closed when without current are used for the purpose, which are distinguished by the fact that when the magnet actuator system is not being supplied with current, the solenoid valve is in its closed state. The magnet actuator system acts on an armature, supported axially displaceably in a housing, on one end of which a valve sealing body is disposed, which cooperates with a corresponding valve seat for closing or opening a flow opening. A pole core of the magnet actuator system is associated with the other end of the armature; when a voltage is applied, it exerts a magnetic field on the armature in order to shift it axially. So that the valve will remain closed if there is a power failure, a compression spring acting in prestressed fashion is provided between the pole core and the armature. It is known to dispose the compression spring directly between the pole core and the armature. Upon assembly, the prestressing force of the compression spring is established when the pole core is secured, for instance press-fitted, in the appropriate (axial) position in the housing. The prestressing force is greatly influenced by the various part tolerances, such as those with respect to the length of the compression spring, the installation space for the compression spring, and/or the spring rate. This can have an adverse effect on the function of the solenoid valve. Moreover, both for venting the solenoid valve and for exchanging the fluid in a reciprocating motion of the armature, longitudinal slots on the outer jacket face of the armature are provided, which reduce the cross-sectional area of the armature that influences the magnetic circuit.

ADVANTAGES AND SUMMARY OF THE INVENTION

The solenoid valve of the invention has the advantage that first, existing tolerances can be taken into account and/or compensated for very much better, and second, that the maximum operative magnetic force is increased. The solenoid valve of the invention is distinguished in that the compression spring is held in prestressed fashion in an axial passage of the armature, between a bolt, having the valve sealing body and held in a selectable position in the axial passage in force- and/or form-locking fashion, and a thrust piece, disposed such that it can be pushed out of the axial passage up to a stop and subjects the pole core to the prestressing force. Thus the armature has an axial passage, which extends axially in conduitlike fashion through the entire armature. Preferably, the axial passage is embodied centrally, or centrally/coaxially. In the simplest case, the axial passage is embodied as a through bore. The compression spring rests in this axial passage and is kept prestressed between the bolt and the thrust piece. The bolt has the valve sealing body; it is understood that the valve sealing body is disposed on the bolt, on the side of the bolt facing away from the armature, so that this sealing body can cooperate with the sealing seat of the solenoid valve. The bolt is kept in a selectable position in the axial passage in force- and/or form-locking fashion. This means that the bolt can be held or secured in various axial positions in the axial passage. Its position in the axial passage is defined by a force- and/or form-locking connection. As a result, it is possible upon assembly to insert the bolt variously far into the axial passage and keep it there. The thrust piece is disposed such that it can be pushed up to a stop out of the axial passage. The movement travel of the thrust piece in the axial passage is accordingly limited by the stop, in such a way that the thrust piece cannot be pushed all the way out of the axial passage. However, until it reaches the stop, the thrust piece is entirely freely (axially) shiftable. In the assembled state, the thrust piece subjects the pole core to the prestressing force of the compression spring. This means that in the assembled state, the thrust piece is kept spaced apart from the axial stop, since then the movement travel of the thrust piece is limited by the pole core. Upon assembly of the solenoid valve, it is now possible to adjust the prestressing force of the compression spring precisely. By displacement of the bolt into the axial passage, the compression spring is tensed against the thrust piece, which upon assembly is in a practical way not yet acted upon by the pole core but instead rests on the stop of the armature. As a result, the spring chamber is clearly defined, and the prestressing force can be calculated for instance as a function of the displacement travel of the bolt. Preferably, however, the bolt is inserted iteratively or piece by piece farther and farther into the axial passage, until the desired prestressing force is reached, and the prestressing force is detected after every incremental insertion of the bolt, in particular by subjecting the thrust piece to a defined contrary force in the direction of the compression spring. Advantageously, the contrary force is selected such that it corresponds to the desired prestressing force. If the thrust piece can then, because of the contrary force, no longer be shifted axially into the armature, then the desired prestressing force has been reached. Next, the armature is constructed together with the bolt, compression spring and thrust piece, as a preassembled unit. Thus in a simple way, the solenoid valve makes it possible to adjust the prestressing force of the spring precisely and thus to compensate for given part tolerances.

Preferably, the bolt is press-fitted into the axial passage. Thus the bolt and the axial passage form a press fit, which keeps the bolt in force-locking fashion in the axial passage. For inserting the bolt, in order to adjust the prestressing force of the compression spring, all that has to be done is for the clamping force of the press fit to be overcome. This affords especially simple locking of the bolt in a desired position in the axial passage. Alternatively, a self-locking thread would also be conceivable, by means of which the bolt can be screwed into the axial passage until the desired prestressing force is reached.

Advantageously, the thrust piece is embodied in T-shaped fashion; with its at least essentially cylindrical base body which is a longitudinal beam, it protrudes out of the axial passage, so that it can subject the pole core to the prestressing force. A radial protrusion which is a transverse beam extending over the circumference of the base body cooperates with a protrusion that protrudes into the axial passage and forms the stop. The T-shaped embodiment of the thrust piece is understood in this connection to refer to the contour of the thrust piece in longitudinal section.

Advantageously, the axial passage is embodied in tapered form on the end associated with the pole core. This results in the embodiment of the protrusion that acts as a stop. Preferably, the taper is embodied as a step, so that the protrusion forms an axial stop face.

Advantageously, the compression spring is embodied as a helical spring. Because of its long-term load-bearing capacity, this permits long-term reliable operation of the solenoid valve.

It is moreover provided that the bolt and/or the thrust piece each have at least one longitudinal slot on their outer jacket face. The longitudinal slot extends from one end to the other end of the bolt or thrust piece, as applicable, so that a fluid communication or a fluid conduit along the bolt and/or the thrust piece is offered, through which the fluid, such as brake fluid, can flow during a reciprocation event. As a result, the otherwise usual longitudinal slots provided on the outer jacket face of the armature can be omitted, so that the armature is advantageously embodied as free of longitudinal slots. As a result, the cross-sectional area relevant to the magnet actuator system is increased. Thus the maximum possible magnet force with which the armature can be actuated is increased.

Finally, it is provided that the valve sealing body is embodied in one piece with the bolt. Since the bolt is press-fitted firmly into the axial passage, or held in some other way in form- and/or force-locking fashion in the axial passage, the valve sealing body is also firmly joined to the armature, which results in an especially compact, reliable assembly.

The armature of the invention is distinguished in that the axial receptacle is embodied as an axial passage, and the compression spring is held in prestressed fashion in the axial passage between a bolt, having the valve sealing body and held in a selectable position and force- and/or form-locking fashion, and a thrust piece that can be pushed out from the axial passage up to a stop. As already described above, the prestressing force of the compression spring in the armature can be adjusted in a simple way by inserting the bolt into the axial passage. Thus the armature can also be provided in different valves or solenoid valves that have to meet different demands, for instance. The prestressing force of the compression spring can be adapted optimally to the particular area of application.

The method of the invention is distinguished by the steps described above, in which first the thrust piece and then the helical spring are introduced into the axial passage, and finally the bolt is placed so far into the axial passage that the now prestressed compression spring between the bolt and the thrust piece reaches the desired prestressing force. The prestressing force is preferably measured via the thrust piece. Preferably, the prestressing force, or the reaching of the prestressing force, is ascertained by subjecting the thrust piece to a defined force that is counter to the prestressing force. Preferably, the bolt is press-fitted into the axial passage, in particular iteratively.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
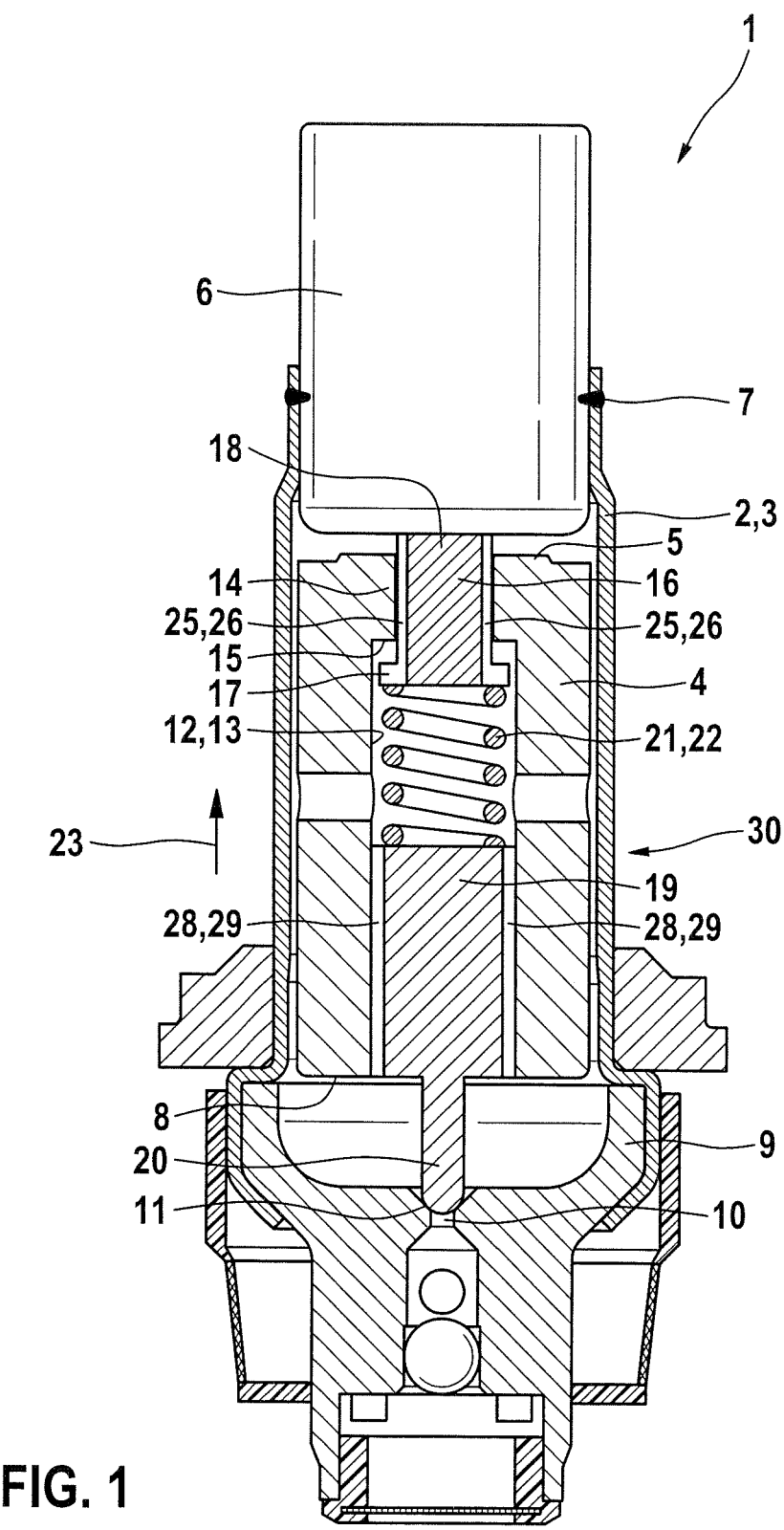
FIG. 1 shows an advantageous solenoid valve in a longitudinal sectional view.

FIG. 1, in a longitudinal-sectional view, shows a solenoid valve 1 for a brake system of a motor vehicle. The solenoid valve 1 includes a housing 2, which is embodied as a cylindrical sleeve 3, and in which a likewise cylindrical armature 4 is disposed longitudinally displaceably or axially shiftably. A pole core 6, disposed or connected in series with the armature 4, is associated with one first end 5 of the armature 4 and is locked in the housing 2, for instance by means of a weld connection 7. A valve body 9 held by the housing 2 is associated with the opposite end 8 of the armature 4 and has a flow opening 10, which is embodied centrally and is provided with a sealing seat 11.

The armature 4 has an axial receptacle 13, embodied as an axial passage 12, which extends centrally through the armature 4. Toward one end 5 of the armature 4, the axial passage 12 is embodied in tapered fashion, such that it has a radially inward-protruding protrusion 14 that forms an axial stop 15. A T-shaped thrust piece 16 is disposed longitudinally displaceably in the tapered region of the axial passage 12, and the at least substantially cylindrical base body extends through the tapered region of the axial passage 12, and a radial protrusion 17, extending over the circumference of the base body, in the axial passage 12 cooperates with the stop 15 in such a way that the thrust piece 16 can be pushed out of the axial passage 12 as far as the stop 15. The length of the base body is greater than the length of the tapered region of the axial passage 12, so that the thrust piece 16, on its free end 18, protrudes from the armature 4 or its end 5, at least when the radial protrusion 17, which is embodied on the end of the thrust piece 16 opposite the end 18, rests on the stop 15.

The armature 4 furthermore has a bolt 19, which is likewise introduced into the axial passage 12, but spaced apart from the thrust piece 16. The bolt 19 has an axially protruding valve sealing body 20, which can cooperate with a sealing valve seat 11 in order to close the flow opening 10. Advantageously, the valve sealing body 20 is embodied in one piece with the bolt 19. The outside diameter of the bolt 19 and the inside diameter of the axial passage 12 are selected such that a press fit is formed, so that upon the assembly of the armature 4, the bolt 19 is press-fitted axially into the axial passage 12 as far as a desired position. The bolt 19 is then held there in force-locking fashion on the armature 4 by the press-fit combination.

Between the bolt 19 and the thrust piece 16, a compression spring 21 is also disposed in the axial passage 12; in the present case it is embodied as a helical spring 22 and is tensed between the thrust piece 16 and the bolt 19.

In the assembly of the solenoid valve 1 or armature 4, first the thrust piece 16 is introduced into the axial passage 12, until with the radial protrusion 17 it rests on the stop 15. Next, the compression spring 21 is introduced into the axial passage 12. Finally, the bolt 19 is press-fitted into the axial passage 12, so that the compression spring 21 is tensed between the thrust piece 16 and the bolt 19. To achieve a desired prestressing of the compression spring 21, the bolt 19 is inserted iteratively, that is, in increments, into the axial passage 12. Since the armature 4, in this production step, has not yet been constructed in the housing 2, it is ensured that the thrust piece 16 is then resting on the stop 15. To ensure that the desired prestressing of the compression spring 21 is reached, a certain contrary force is exerted on the thrust piece 16 in the direction of the bolt 19 after each incremental insertion of the bolt 19. If the contrary force is equivalent to the desired prestressing of the compression spring 21, the thrust piece 16 can no longer be shifted farther into the axial passage 12, so it is simple to detect that the desired prestressing force 21 has been reached. Alternatively, a force measuring instrument can be associated with the end 18 of the thrust piece 16 as well, and this instrument shifts the thrust piece 16 into the axial passage 12 by a defined distance, so that the thrust piece 16 does not rest on the stop 15. If the prestressing force is increased by inserting the bolt 19, this can be detected quickly and easily by the force measuring instrument. Thus the bolt 19 is driven until such time, or far enough, into the axial passage 12 that the desired prestressing force of the compression spring 21 is reached. Next, the armature 4 is constructed in the housing 2 of the solenoid valve 1, so that the valve sealing body 20 is seated in the valve seat 11, and the thrust piece 16 acts on the pole core 6 with the prestressing force of the compression spring 21, or optionally with a somewhat greater prestressing force, which results from the fact that the thrust piece 16 has been thrust to some distance into the axial passage 12. The prestressing force of the compression spring 21 has the effect that the valve sealing body 20 is pressed into the valve seat 11, and as a result the flow opening is closed. By actuation of a magnet actuator system, which also includes the pole core 6, the armature 4 is moved in the direction of an arrow 23 toward the pole core 6, so that the valve sealing body 20 comes away from the valve seat 11 and thereby opens the flow opening 10.

Since the prestressing of the compression spring 21 can be adjusted very precisely, production tolerances with regard to the components of the solenoid valve 1, and in particular the components of the armature 4, can be optimally compensated for, so that secure closure of the flow opening 10 as well as secure opening of the flow opening 10 are always ensured. Furthermore, the effort and expense for producing the individual parts of the solenoid valve 1 are reduced, since now, in production, less attention has to be paid to the possible production tolerances. The overall result is a simple solenoid valve 1 that can be produced economically and whose long-term reliable operation is ensured.

Figure 2:
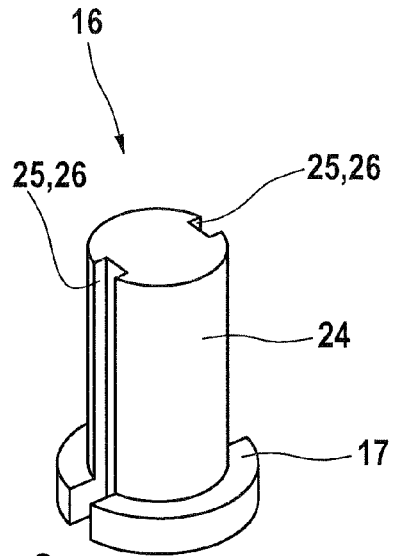
FIG. 2 shows a thrust piece of the solenoid valve in a perspective view.

FIG. 2 shows the thrust piece 16 in a perspective view. In its outer jacket face 24, the thrust piece 16 has two opposed longitudinal slots 25, which each form a fluid conduit 26.

Figure 3:
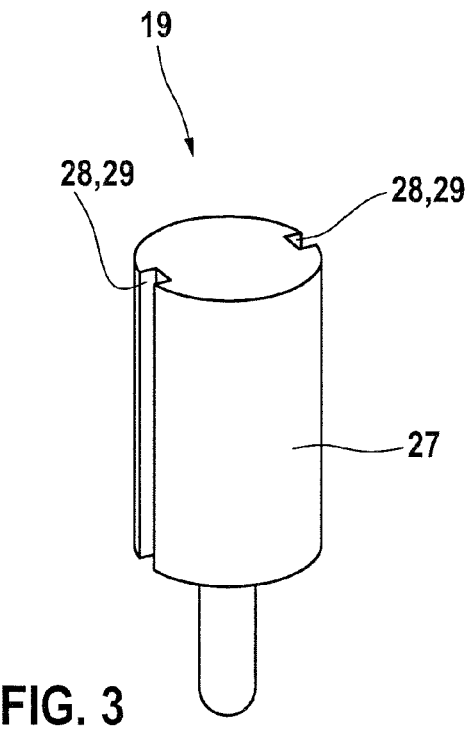
FIG. 3 shows a bolt of the solenoid valve in a perspective view.

The bolt 19 shown in FIG. 3 in a perspective view advantageously also has two opposed longitudinal slots 28 in its outer jacket face 27, and they each form one fluid conduit 29. Naturally, more or fewer longitudinal slots 25 and 28 can be provided on the thrust piece 16 and the bolt 19, respectively, instead. Nor need the longitudinal slots 25, 28 have a rectangular cross section as shown. Curved, triangular or polygonal cross sections are equally conceivable. In operation, the longitudinal slots 25, 28 make it possible for the fluid to flow through the armature 4, in particular during a reciprocation event of the armature 4, so that a pressure equalization can take place. The longitudinal slots 25, 28 can also be used for ventilating the solenoid valve 1. As a result of the provision of the longitudinal slots 25, 28, the otherwise usual longitudinal slots provided on the outside of the jacket of the armature 4 can be omitted, and as a result the maximum magnetic force operative on the armature 4 is increased.

Figure 4:
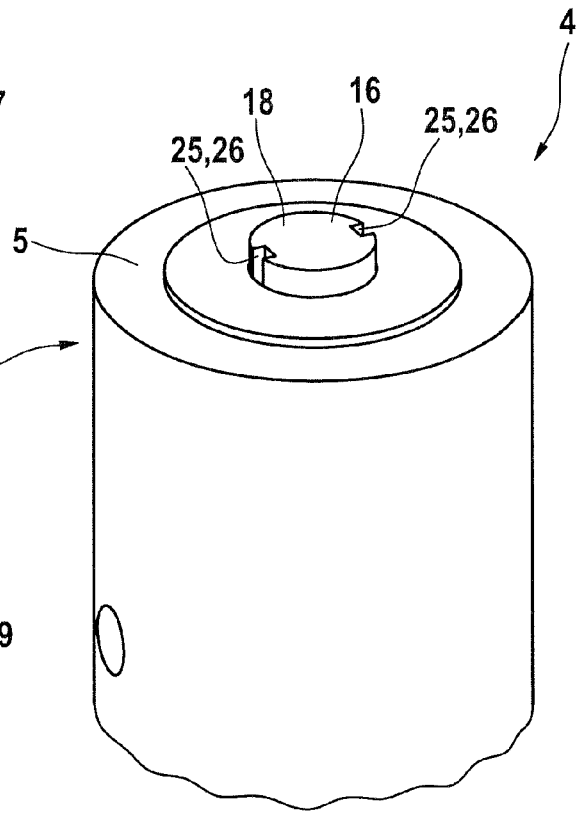
FIG. 4 shows an armature of the solenoid valve in a perspective view.

FIG. 4 shows the armature 4 in perspective in a plan view on the end 5. In the armature 4, which together with the thrust piece 16, the compression spring 21, and the bolt 19, forms a preassembled unit 30, the thrust piece 16 in the unstressed state is forced out of the armature 4 by the prestressing of the compression spring 21, so that it protrudes from the end 5 of the armature 4 in such a way that via the thrust piece 16, the prestressing force of the compression spring 21 or helical spring 22 can be detected, and in the constructed state, the prestressing force can be transmitted to the pole core.

The foregoing relates to a preferred exemplary embodiment of the invention, it being understood that other variants and embodiments thereof are possible within the spirit and scope of the invention, the latter being defined by the appended claims.

I claim:

1. A solenoid valve, in particular for a brake system of a motor vehicle, comprising:
    an axially displaceably supported armature, on one end of which a valve sealing body is disposed and with the other end of which a pole core is associated; and
    a compression spring acting in prestressed fashion between the pole core and the armature, wherein the compression spring is held in prestressed fashion in an axial passage of the armature, between a bolt, having the valve sealing body and being held in a selectable position in the axial passage in force- and/or form-locking fashion, and a thrust piece, disposed such that the thrust piece can be pushed out of the axial passage up to a stop, the thrust piece subjecting the pole core to a prestressing force of the compression spring wherein the bolt and/or the thrust piece each have at least one longitudinal slot on an outer jacket face thereof.

2. The solenoid valve as defined by claim 1, wherein the sealing body is embodied in one piece with the bolt.

3. The solenoid valve as defined by claim 1, wherein the armature has an axial receptacle, in which the compression spring rests in at least some regions, wherein the axial receptacle is embodied as the axial passage, and the compression spring is held in prestressed fashion in the axial passage between the bolt with its valve sealing body and being held in a selectable position and force- and/or form-locking fashion, and the thrust piece that can be pushed out from the axial passage up to a stop.

4. A method for producing an armature for a solenoid valve as defined by claim 1, having the steps of:
    introducing first the thrust piece and next the compression spring are into the axial passage, and then in conclusion introducing the bolt so far into the axial passage that the compression spring, tensed between the bolt and the thrust piece, attains a desired prestressing force; and
    ascertaining the prestressing force of the compression spring by subjecting the thrust piece to a defined contrary force.

5. The method as defined by claim 4, wherein the bolt is press-fitted, in particular iteratively, into the axial passage.

6. A solenoid valve, in particular for a brake system of a motor vehicle, comprising:

an axially displaceably supported armature, on one end of which a valve sealing body is disposed and with the other end of which a pole core is associated; and a compression spring acting in prestressed fashion between the pole core and the armature, wherein the compression spring is held in prestressed fashion in an axial passage of the armature, between a bolt, having the valve sealing body and being held in a selectable position in the axial passage in force- and/or form-locking fashion, and a thrust piece, disposed such that the thrust piece can be pushed out of the axial passage up to a stop, the thrust piece subjecting the pole core to a prestressing force of the compression spring. wherein the bolt is press-fitted into the axial passage and wherein the bolt and/or the thrust piece each have at least one longitudinal slot on an outer jacket face thereof.

7. The solenoid valve as defined by claim 6, wherein the thrust piece is embodied as T-shaped.

8. The solenoid valve as defined by claim 6, wherein the axial passage is embodied as tapered on its end associated with the pole core.

9. A solenoid valve, in particular for a brake system of a motor vehicle, comprising:

an axially displaceably supported armature, on one end of which a valve sealing body is disposed and with the other end of which a pole core is associated; and a compression spring acting in prestressed fashion between the pole core and the armature, wherein the compression spring is held in prestressed fashion in an axial passage of the armature, between a bolt, having the valve sealing body and being held in a selectable position in the axial passage in force- and/or form-locking fashion, and a thrust piece, disposed such that the thrust piece can be pushed out of the axial passage up to a stop, the thrust piece subjecting the pole core to a prestressing force of the compression spring, wherein the thrust piece is embodied as T-shaped and wherein the bolt and/or the thrust piece each have at least one longitudinal slot on an outer jacket face thereof.

10. The solenoid valve as defined by claim 9, wherein the axial passage is embodied as tapered on its end associated with the pole core.

11. The solenoid valve as defined by claim 9, wherein the compression spring is embodied as a helical spring.

12. A solenoid valve, in particular for a brake system of a motor vehicle, comprising:

an axially displaceably supported armature, on one end of which a valve sealing body is disposed and with the other end of which a pole core is associated; and a compression spring acting in prestressed fashion between the pole core and the armature, wherein the compression spring is held in prestressed fashion in an axial passage of the armature, between a bolt, having the valve sealing body and being held in a selectable position in the axial passage in force- and/or form-locking fashion, and a thrust piece, disposed such that the thrust piece can be pushed out of the axial passage up to a stop, the thrust piece subjecting the pole core to a prestressing force of the compression spring, wherein the axial passage is embodied as tapered on its end associated with the pole core and wherein the bolt and/or the thrust piece each have at least one longitudinal slot on an outer jacket face thereof.

13. The solenoid valve as defined by claim 12, wherein the compression spring is embodied as a helical spring.

14. A The solenoid valve, in particular for a brake system of a motor vehicle, comprising:

an axially displaceably supported armature, on one end of which a valve sealing body is disposed and with the other end of which a pole core is associated; and a compression spring acting in prestressed fashion between the pole core and the armature, wherein the compression spring is held in prestressed fashion in an axial passage of the armature, between a bolt, having the valve sealing body and being held in a selectable position in the axial passage in force- and/or form-locking fashion, and a thrust piece, disposed such that the thrust piece can be pushed out of the axial passage up to a stop, the thrust piece subjecting the pole core to a prestressing force of the compression spring, wherein the compression spring is embodied as a helical spring and wherein the bolt and/or the thrust piece each have at least one longitudinal slot on an outer jacket face thereof.

* * * * *